(12) United States Patent
Feng et al.

(10) Patent No.: US 8,734,996 B2
(45) Date of Patent: *May 27, 2014

(54) ANODE OF LITHIUM BATTERY AND METHOD FOR FABRICATING THE SAME

(75) Inventors: Chen Feng, Beijing (CN); Kai-Li Jiang, Beijing (CN); Liang Liu, Beijing (CN); Xiao-Bo Zhang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 1128 days.

This patent is subject to a terminal disclaimer.

(21) Appl. No.: 12/002,143

(22) Filed: Dec. 14, 2007

(65) Prior Publication Data

US 2008/0299460 A1 Dec. 4, 2008

(30) Foreign Application Priority Data

Jun. 1, 2007 (CN) .......................... 2007 1 0074700

(51) Int. Cl.
  *H01M 8/04* (2006.01)
  *H01M 2/00* (2006.01)
  *H01M 4/13* (2010.01)
  *H01M 4/58* (2010.01)
  *H01M 4/62* (2006.01)
  *H01B 1/06* (2006.01)

(52) U.S. Cl.
  USPC ............... 429/231.8; 429/232; 429/231.95; 429/163; 252/506; 977/742; 977/842

(58) Field of Classification Search
  None
  See application file for complete search history.

(56) References Cited

U.S. PATENT DOCUMENTS

| | | | | |
|---|---|---|---|---|
| 6,280,697 B1 * | 8/2001 | Zhou et al. | ..................... | 423/414 |
| 6,489,026 B1 * | 12/2002 | Nishimura et al. | ........... | 428/367 |
| 6,808,746 B1 * | 10/2004 | Dai et al. | ................... | 427/249.1 |
| 6,924,335 B2 | 8/2005 | Fan et al. | | |
| 7,054,064 B2 | 5/2006 | Jiang et al. | | |

(Continued)

FOREIGN PATENT DOCUMENTS

| | | |
|---|---|---|
| JP | 2003286017 | 10/2003 |
| JP | 2005097003 | 4/2005 |

(Continued)

OTHER PUBLICATIONS

Ng et al.; Single Wall Carbon Nanotube Paper as Anode for Lithium-Ion Battery; Electrochimica Acta; 51, pp. 23-28; 2005.*

(Continued)

*Primary Examiner* — Guinever Gregorio
(74) *Attorney, Agent, or Firm* — Novak Druce Connolly Bove + Quigg LLP

(57) ABSTRACT

An anode of a lithium battery includes a supporting member and a carbon nanotube film disposed on a surface of the support member. The carbon nanotube film includes at least two overlapped and intercrossed layers of carbon nanotubes. Each layer includes a plurality of successive carbon nanotube bundles aligned in the same direction. A method for fabricating the anode of the lithium battery includes the steps of: (a) providing an array of carbon nanotubes; (b) pulling out, by using a tool, at least two carbon nanotube films from the array of carbon nanotubes; and (c) providing a supporting member and disposing the carbon nanotube films to the supporting member along different directions and overlapping with each other to achieving the anode of lithium battery.

18 Claims, 3 Drawing Sheets

(56) References Cited

U.S. PATENT DOCUMENTS

| | | | |
|---|---|---|---|
| 7,205,069 B2* | 4/2007 | Smalley et al. | 429/129 |
| 7,459,627 B2 | 12/2008 | Lee et al. | |
| 7,586,249 B2 | 9/2009 | Jiang et al. | |
| 8,017,272 B2* | 9/2011 | Feng et al. | 429/231.8 |
| 2002/0094311 A1* | 7/2002 | Smalley et al. | 422/198 |
| 2002/0150524 A1* | 10/2002 | Smalley et al. | 422/198 |
| 2002/0159943 A1* | 10/2002 | Smalley et al. | 423/447.1 |
| 2003/0129497 A1* | 7/2003 | Yamamoto et al. | 429/246 |
| 2003/0211029 A1* | 11/2003 | Someya et al. | 423/447.3 |
| 2004/0047038 A1 | 3/2004 | Jiang et al. | |
| 2004/0071949 A1 | 4/2004 | Glatkowski et al. | |
| 2004/0105807 A1 | 6/2004 | Fan et al. | |
| 2005/0249656 A1* | 11/2005 | Smalley et al. | 423/447.3 |
| 2005/0260120 A1* | 11/2005 | Smalley et al. | 423/447.1 |
| 2006/0018018 A1 | 1/2006 | Nomura et al. | |
| 2006/0121185 A1 | 6/2006 | Xu et al. | |
| 2007/0043158 A1* | 2/2007 | Smalley et al. | 524/495 |
| 2007/0048209 A1* | 3/2007 | Smalley et al. | 423/447.1 |
| 2007/0103052 A1 | 5/2007 | Jeng et al. | |
| 2007/0134555 A1* | 6/2007 | Ren et al. | 429/245 |
| 2008/0018012 A1* | 1/2008 | Lemaire et al. | 264/82 |
| 2008/0170982 A1* | 7/2008 | Zhang et al. | 423/447.3 |
| 2008/0198453 A1 | 8/2008 | LaFontaine et al. | |
| 2008/0299460 A1 | 12/2008 | Feng et al. | |
| 2008/0308209 A1* | 12/2008 | Loutfy et al. | 156/62.2 |
| 2009/0085461 A1 | 4/2009 | Feng et al. | |
| 2009/0098453 A1* | 4/2009 | Liu et al. | 429/163 |
| 2009/0098463 A1* | 4/2009 | Liu et al. | 429/231.95 |
| 2009/0110897 A1* | 4/2009 | Humfeld et al. | 428/221 |
| 2009/0159188 A1 | 6/2009 | Jiang et al. | |
| 2009/0159328 A1 | 6/2009 | Dai et al. | |
| 2009/0160799 A1 | 6/2009 | Jiang et al. | |
| 2009/0170394 A1 | 7/2009 | Liu et al. | |
| 2009/0181239 A1 | 7/2009 | Fan et al. | |
| 2009/0195140 A1 | 8/2009 | Wei et al. | |
| 2009/0239072 A1 | 9/2009 | Wei et al. | |
| 2010/0075469 A1 | 3/2010 | Liu et al. | |
| 2010/0270911 A1 | 10/2010 | Liu et al. | |
| 2010/0282403 A1 | 11/2010 | Liu et al. | |
| 2010/0297502 A1* | 11/2010 | Zhu et al. | 429/231.8 |

FOREIGN PATENT DOCUMENTS

| | | |
|---|---|---|
| TW | 200410901 | 7/2004 |
| TW | I245303 | 12/2005 |
| TW | I248630 | 2/2006 |
| TW | I257639 | 7/2006 |
| TW | I277124 | 3/2007 |
| TW | 200713384 | 4/2007 |
| TW | I238555 | 5/2008 |
| WO | WO 0073204 | 12/2000 |
| WO | WO 2007055744 | 5/2007 |
| WO | WO 2007061428 | 5/2007 |

OTHER PUBLICATIONS

Chew et al. Flexible Free-Standing Carbon Nanotube Films for Model Lithium Batteries; Carbon; 47, 2976-2983; 2009.*

Spinning and processing continuous yarns from 4-inch wafer scale super-aligned carbon nanotube arrays,Adv. Mater 2006, 18, 1505-1510,2006 Wiley-VCH Verlag GmbH & Co. KGaA, Weinheim.

Ashavani Kumar, Victor L. Pushparaj, Swastik Kar, Omkaram Nalamasu, and Pulickel M. Ajayan:"Contact transfer of aligned carbon nanotube arrays onto conducting substrates", Applied Physics Letters, 89, 163120(Oct. 19, 2006).

* cited by examiner

ANODE OF LITHIUM BATTERY AND METHOD FOR FABRICATING THE SAME

RELATED APPLICATIONS

This application is related to commonly-assigned applications entitled, "CARBON NANOTUBE FILM STRUCTURE AND METHOD FOR FABRICATING THE SAME", filed Ser. No. 12/002,129, "OPTICAL POLARIZER AND METHOD FOR FABRICATING THE SAME", filed Ser. No. 12/002,169, and "FIELD EMISSION CATHODE AND METHOD FOR FABRICATING THE SAME", filed Ser. No. 12/002,144. Disclosures of the above-identified applications are incorporated herein by reference.

BACKGROUND

1. Field of the Invention

The present invention relates to anodes of lithium batteries and methods for fabricating the same and, particularly, to a carbon-nanotube-based anode of a lithium battery and a method for fabricating the same.

2. Discussion of Related Art

In recent years, lithium batteries have been received a greatest amount of attention and used in various portable devices, such as notebook PCs, mobile phones and digital cameras for their small weight, high discharge voltage, long cyclic life and high energy density compared with conventional lead storage batteries, nickel-cadmium batteries, nickel-hydrogen batteries, and nickel-zinc batteries.

An anode of a lithium battery should have such properties as high energy density; low open-circuit voltage versus metallic lithium electrode; high capacity retention; good performance in common electrolytes; high density (e.g. >2.0 g/cm$^3$); good stability during charge and discharge processes and low cost. At present, the most widely used anode active material is carbonous/carbonaceous material such as natural graphite, artificial graphite and amorphous-based carbon. Amorphous-based carbon has excellent capacity, but the irreversibility thereof is relatively high. The theoretical maximum capacity of natural graphite is 372 mAh/g, but the lifetime thereof is generally short.

In general, carbonous/carbonaceous material anode has low efficiency and cycle performance in the first charge and discharge cycle due to the formation of Solid Electrolyte Interface (SEI) layer. The stable SEI layer is essential in the lithium battery to prevent anode material from reacting with the electrolyte, therefore, the selection of the electrolyte is limited. Only the electrolytes in which a stable SEI layer can be formed are suitable for using in a lithium battery.

What is needed, therefore, is to provide an anode of a lithium battery and a method for fabricating the same, in which the above problems are eliminated or at least alleviated.

SUMMARY

In one embodiment, an anode of a lithium battery includes a supporting member; and a carbon nanotube film disposed on a surface of the supporting member. The carbon nanotube film includes at least two overlapped and crossed layers of carbon nanotubes. Each layer includes a plurality of successive carbon nanotube bundles aligned in the same direction.

In another embodiment, a method for fabricating the above-described anode of a lithium battery includes the steps of: (a) providing an array of carbon nanotubes; (b) pulling out at least two carbon nanotube films from the array of carbon nanotubes by a tool; and (c) providing a supporting member, disposing the carbon nanotube films to the supporting member along different directions and overlapping with each other to achieve the anode of the lithium battery.

Other advantages and novel features of the present carbon-nanotube-based anode of lithium battery and the related method for fabricating the same will become more apparent from the following detailed description of preferred embodiments when taken in conjunction with the accompanying drawings.

BRIEF DESCRIPTION OF THE DRAWINGS

Many aspects of the present carbon-nanotube-based anode of lithium battery and the related method for fabricating the same can be better understood with reference to the following drawings. The components in the drawings are not necessarily to scale, the emphasis instead being placed upon clearly illustrating the principles of the present carbon-nanotube-based anode of lithium battery and the related method for fabricating the same.

Figure 1:
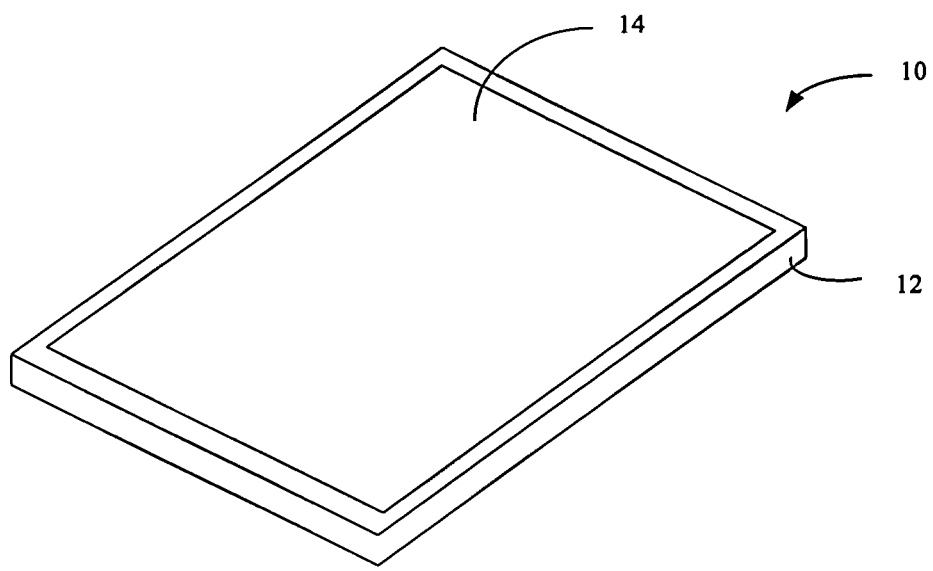
FIG. 1 is a schematic view of an anode of a lithium battery, in accordance with a present embodiment.

Corresponding reference characters indicate corresponding parts throughout the several views. The exemplifications set out herein illustrate at least one preferred embodiment of the present carbon-nanotube-based anode of lithium battery and the related method for fabricating the same, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present carbon-nanotube-based anode of lithium battery and related method for fabricating the same.

Referring to FIG. 1, an anode 10 of lithium battery in the present embodiment includes a supporting member 12 and a carbon nanotube film 14 supported by the supporting member 12. The supporting member 12 can, beneficially, be a metal substrate. Quite suitably, the metal substrate is copper sheet. The carbon nanotube film 14 can, advantageously, be disposed on a surface of the supporting member 12 directly. The carbon nanotube film 14 is a multi-layer film and includes at least two layers of carbon nanotubes. Each layer of carbon nanotube film 14 includes a plurality of successive carbon nanotube bundles joined end to end and are aligned in the same direction. The layers of carbon nanotube film cross and overlap with each other. The angle between the aligned directions of two adjacent layers is arbitrarily.

It is to be understood that, the supporting member 12 in the anode 10 of the lithium battery in the present embodiment is optional. In another embodiment, the anode 10 of the lithium battery can only include of carbon nanotube film 14. Due to a plurality of carbon nanotube layers being piled to form a self-sustained and stable film structure, the carbon nanotube film 14 can be used as an anode 10 in the lithium battery without the supporting member.

In the present embodiment, a width of the carbon nanotube film 14 is in the approximate range from 1 centimeter to 10 centimeters. A thickness of the carbon nanotube film 14 is in the approximate range from 0.01 micron to 100 microns. It is to be understood that, the size of the carbon nanotube film 14 is arbitrarily. After a cutting step, a smaller size (e.g. a 8 mm×8 mm) of carbon nanotube film can be formed for the use of the carbon-nanotube-based anode in a miniature lithium battery.

When the carbon nanotube film 14 is used in the lithium battery anode, the intercalation amount of lithium ion can be enhanced and the stability of SEI layer formed in the first charge/discharge cycle can be improved by the special microporous structure of the carbon nanotube film 14.

Figure 2:
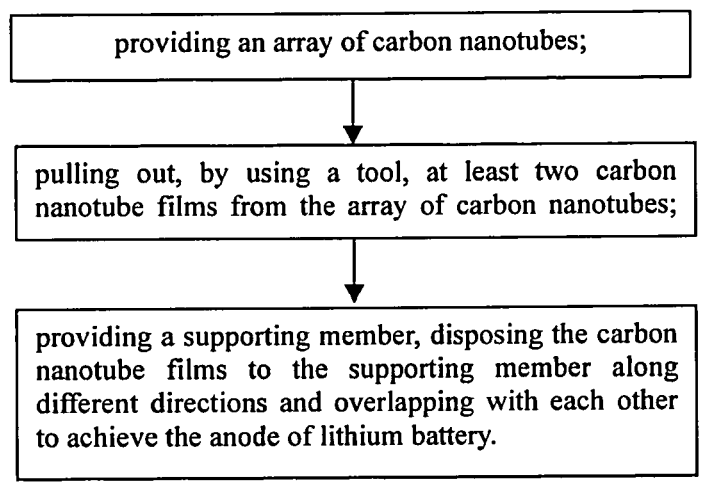
FIG. 2 is a flow chart of a method for fabricating the anode of the lithium battery of FIG. 1.

Referring to FIG. 2, a method for fabricating the anode 10 of the lithium battery includes the steps of: (a) providing an array of carbon nanotubes, quite suitably, providing a super-aligned array of carbon nanotubes; (b) pulling out at least two carbon nanotube films from the array of carbon nanotubes, by using a tool (e.g., adhesive tape or another tool allowing multiple carbon nanotubes to be gripped and pulled simultaneously); and (c) providing a supporting member and disposing the carbon nanotube films to the supporting member along different directions, the carbon nanotube films overlapping with each other to achieve the anode of lithium battery.

In step (a), a given super-aligned array of carbon nanotubes can be formed by the steps of: (a1) providing a substantially flat and smooth substrate; (a2) forming a catalyst layer on the substrate; (a3) annealing the substrate with the catalyst at a temperature in the approximate range of 700° C. to 900° C. in air for about 30 to 90 minutes; (a4) heating the substrate with the catalyst at a temperature in the approximate range from 500° C. to 740° C. in a furnace with a protective gas therein; and (a5) supplying a carbon source gas into the furnace for about 5 to 30 minutes and growing a super-aligned array of the carbon nanotubes from the substrate.

In step (a1), the substrate can, beneficially, be a P-type silicon wafer, an N-type silicon wafer, or a silicon wafer with a film of silicon dioxide thereon. Quite suitably, a 4-inch P-type silicon wafer is used as the substrate.

In step (a2), the catalyst can, advantageously, be made of iron (Fe), cobalt (Co), nickel (Ni), or any combination alloy thereof.

In step (a4), the protective gas can, beneficially, be made up of at least one of nitrogen ($N_2$), ammonia ($NH_3$), and a noble gas. In step (a5), the carbon source gas can, advantageously, be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, be in a height of about 200 to 400 microns and includes a plurality of carbon nanotubes parallel to each other and approximately perpendicular to the substrate. The super-aligned array of carbon nanotubes formed under the above conditions is essentially free of impurities, such as carbonaceous or residual catalyst particles. The carbon nanotubes in the super-aligned array are packed together closely by van der Waals attractive force.

In step (b), carbon nanotube films can, beneficially, be pulled out from the super-aligned array of carbon nanotubes by the substeps of: (b1) selecting a plurality of carbon nanotube segments having a predetermined width; (b2) pulling the carbon nanotube segments at an even/uniform speed to form one carbon nanotube film; (b3) repeating step (b1) and (b2) to form a plurality of carbon nanotube films.

In step (b1), quite usefully, the carbon nanotube segments having a predetermined width can be selected by using a wide adhesive tape as the tool to contact the super-aligned array. In step (b2) the pulling direction is, usefully, substantially perpendicular to the growing direction of the super-aligned array of carbon nanotubes.

More specifically, during the pulling process, as the initial carbon nanotube segments are drawn out, other carbon nanotube segments are also drawn out end to end, due to the van der Waals attractive force between ends of the adjacent segments. This process of drawing ensures a successive carbon nanotube film can be formed. The carbon nanotubes of the carbon nanotube film are all substantially parallel to the pulling direction, and the carbon nanotube film produced in such manner is able to formed to have a selectable, predetermined width.

The width of the first carbon nanotube film depends on the size of the carbon nanotube array. The length of the first carbon nanotube film is arbitrary. In one useful embodiment, when the size of the substrate is 4 inches, the width of the first carbon nanotube film is in the approximate range from 1 centimeter to 10 centimeters, and the thickness of the first carbon nanotube film is in the approximate range from 0.01 to 100 microns.

In step (c), the supporting member can, beneficially, be a metal substrate. Quite suitably, the metal substrate is a copper sheet.

It is noted that because the carbon nanotubes in the super-aligned array in step (a) has a high purity and a high specific surface area, the carbon nanotube film is adhesive. As such, in step (c), the first carbon nanotube film can be adhered to the surface of the supporting member directly.

It will be apparent to those having ordinary skill in the field of the present invention that a piled multi-layer carbon nanotube film can be formed before adhering to the supporting member. The size of the multi-layer carbon nanotube film is arbitrarily and depends on the actual needs of utilization (e.g. a miniature lithium battery). A laser beam can be used to cut the carbon nanotube film into smaller size in an open air.

It is to be understood that, in step (c), the supporting member in the anode of the lithium battery is optional. In another embodiment, the anode of the lithium battery can only include carbon nanotube film. Due to a plurality of carbon nanotube layers being overlapped to form a self-sustained and stable film structure, the carbon nanotube film can be solely used as an anode in lithium battery without the supporting member.

A plurality of carbon nanotube films can, advantageously, be adhered to the supporting member along different directions and overlap with each other to form the multi-layer carbon nanotube film. The number of layers and the angle between the aligned directions of two adjacent layers are both arbitrarily and depend on the actual needs/use. The layers of carbon nanotube film are combined by van de Waals attractive force to form a stable multi-layer film. Quite usefully, in the present embodiment, a 200-layer carbon nanotube film is formed. The angle between the aligned directions of two adjacent layers can, opportunely, be 90°.

Quite suitably, an additional step (d) of treating the carbon nanotube film in the anode of the lithium battery with an organic solvent can, advantageously, be further provided after step (c).

In step (d), the carbon nanotube film in the anode of the lithium battery can, beneficially, be treated by either of two methods: dropping an organic solvent from a dropper to soak an entire surface of side carbon nanotube film or immersing the supporting member with the carbon nanotube film thereon into a container having an organic solvent therein. The organic solvent is volatilizable and can be selected from the group consisting of ethanol, methanol, acetone, dichloroethane, chloroform, and combinations thereof. Quite suitably, the organic solvent is ethanol. After being soaked by the organic solvent, the carbon nanotube segments in the carbon nanotube film can at least partially shrink into carbon nanotube bundles due to the surface tension created by the organic solvent. Due to the decrease of the specific surface via bundling, the coefficient of friction of the carbon nanotube film is reduced, but the carbon nanotube film maintains high mechanical strength and toughness. As such, the anode of the lithium battery after treating process can be used conveniently. Further, after treating with the organic solvent, due to the shrinking/compacting of the carbon nanotube segments into carbon nanotube bundles, the parallel carbon nanotube bundles in one layer are, relatively, distant (especially compared to the initial layout of the carbon nanotube segments) to each other and cross with the parallel carbon nanotube bundles in each adjacent layer. As such, a carbon nanotube film having a microporous structure can thus be formed (i.e., the micropores are defined by the spacing/gaps between adjacent bundles).

It is to be understood that the microporous structure is related to the layer number of the carbon nanotube film structure. The greater the number of layers that are formed in the carbon nanotube film structure, the greater the number of bundles in the carbon nanotube film structure will be. Accordingly, the spacing/gaps between adjacent bundles and the diameter of the micropores will decrease. Further, a carbon nanotube film structure having arbitrarily width and length can be formed by piling a plurality of carbon nanotube films and partially overlapping such with each other. The width and length of the carbon nanotube film structure are not confined by the width and the length of the carbon nanotube film pulled from the array of carbon nanotubes.

Figure 3:
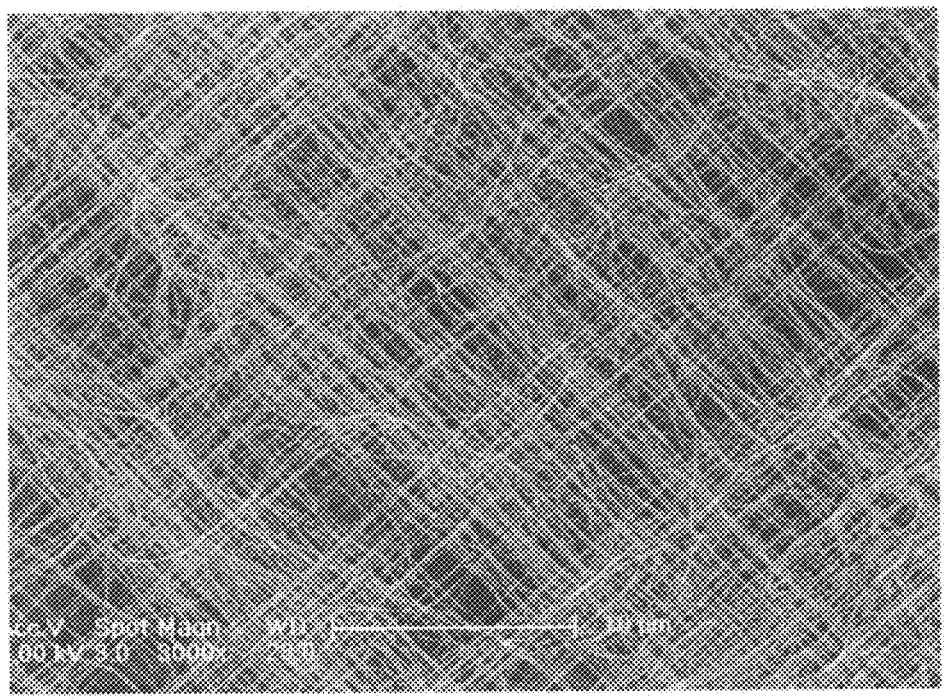
FIG. 3 shows a Scanning Electron Microscope (SEM) image of the anode of the lithium battery of FIG. 1.

Referring to FIG. 3, in the anode of the lithium battery of the present embodiment, the size of the micropores in multi-layer carbon nanotube film are uniform, which are less than about 100 nanometers. As such, a large amount of lithium ion can be absorbed by the micropores during the charge and discharge cycles in the lithium battery due to extreme large specific area of the carbon nanotube film.

Before testing of cycle performance of the carbon nanotube anode, lithium battery can, suitably, be assembled and sealed in an argon-filled glove box. In the present embodiment, the cathode active material is a lithium foil and the anode active material is a 200-layer carbon nanotube film in a weight of about 50 micrograms disposed on the supporting member. The electrolyte is 1 mol/L Lithium Hexafluorophosphate ($LiPF_6$) filled in Ethylene Carbonate (EC) and Diethyl Carbonate (DMC). The volume ratio of EC and DMC is 1:1.

Referring to table 1, the cycle performance of the carbon-nanotube-based anode of lithium battery in room temperature is shown. The anode of the lithium battery has high charge/discharge efficiency, high capacity, and good cycle performance.

TABLE 1

| Cycle Number | Charge Current (mAh) | Discharge Current (mAh) | Efficiency |
| --- | --- | --- | --- |
| 1 | 0 | 0.1084 | 0 |
| 2 | 0.0254 | 0.0372 | 146.8 |
| 3 | 0.0269 | 0.0311 | 115.5 |
| 4 | 0.025 | 0.0283 | 113.2 |
| 5 | 0.024 | 0.0267 | 111.1 |
| 6 | 0.0237 | 0.0261 | 110.3 |
| 7 | 0.0234 | 0.0254 | 108.6 |
| 8 | 0.023 | 0.025 | 108.8 |

TABLE 1-continued

| Cycle Number | Charge Current (mAh) | Discharge Current (mAh) | Efficiency |
| --- | --- | --- | --- |
| 9 | 0.023 | 0.0249 | 108.3 |
| 10 | 0.0227 | 0.0247 | 109.1 |
| 11 | 0.0229 | 0.0249 | 108.6 |
| 12 | 0.0226 | 0.0244 | 108 |
| 13 | 0.0227 | 0 | 0 |

It will be apparent to those having ordinary skill in the field of the present invention that, the composition of the cathode and the electrolyte are not limited to the above-mentioned materials. The intercalation amount of lithium ion can be enhanced due to the special microporous film structure of the anode. The stability of the SEI layer formed in the first cycle of charge and discharge can be improved due to the crossed structure of multi-layer carbon nanotube film. As such, the electrolyte used in the lithium battery can be selected from a wider range of common electrolytes.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. A lithium battery, comprising:
   a cathode;
   a lithium-conducting electrolyte; and
   an anode comprising a carbon nanotube film being configured as both an anode active material and an anode current collector, the carbon nanotube film comprising at least two layers of carbon nanotubes overlapped with each other, each of the at least two layers of carbon nanotubes comprising a plurality of successive carbon nanotube bundles substantially aligned along a same direction and joined end to end by van de Waals attractive force, wherein the plurality of successive carbon nanotube bundles in different layers of the at least two layers of carbon nanotubes are crossed.

2. The lithium battery of claim 1, wherein the carbon nanotube film consists of the plurality of successive carbon nanotube bundles.

3. The lithium battery of claim 1, wherein the plurality of successive carbon nanotube bundles are substantially parallel to a surface of the carbon nanotube film.

4. The lithium battery of claim 1, wherein each of the at least two layers of carbon nanotubes is formed by:
   drawing initial carbon nanotube segments out from an array of carbon nanotubes along a direction perpendicular to a growing direction of the array of carbon nanotubes, thereby other carbon nanotube segments being drawn out end to end from the array of carbon nanotubes, due to the van der Waals attractive force between ends of adjacent carbon nanotube segments.

5. The lithium battery of claim 4, wherein the plurality of successive carbon nanotube bundles are resulted from the initial and other carbon nanotube segments treated by an organic solvent applied to the carbon nanotube film.

6. The lithium battery of claim 5, wherein micropores are defined by crossing of the plurality of successive carbon nanotube bundles in different layers of the at least two layers of carbon nanotubes.

7. The lithium battery of claim 1, wherein a width of the carbon nanotube film is in an approximate range from about 1 centimeter to about 10 centimeters.

8. The lithium battery of claim 1, wherein a thickness of the carbon nanotube film is in an approximate range from about 0.01 micron to about 100 microns.

9. The lithium battery of claim 1, wherein the at least two layers of carbon nanotubes comprise two hundred layers of carbon nanotubes.

10. The lithium battery of claim 1, wherein the carbon nanotube film is free-standing.

11. The lithium battery of claim 1, wherein adjacent layers of the at least two layers carbon nanotubes are combined by van de Waals attractive force.

12. A lithium battery, comprising:
a cathode;
a lithium-conducting electrolyte; and
an anode consisting of a free-standing carbon nanotube film, the carbon nanotube film comprising at least two layers of carbon nanotubes overlapped with each other along different directions, each of the at least two layers of carbon nanotubes comprising a plurality of successive carbon nanotube bundles substantially aligned along a same direction, adjacent carbon nanotube bundles in different layers of the at least two layers of carbon nanotubes are crossed.

13. The lithium battery of claim 12, wherein an angle between the aligned directions of the at least two layers of carbon nanotubes is 90°.

14. The lithium battery of claim 13, wherein the plurality of successive carbon nanotube bundles are substantially parallel to a surface of the carbon nanotube film.

15. The lithium battery of claim 12, wherein adjacent carbon nanotube bundles in different layers of the at least two layers of carbon nanotubes are perpendicular to each other.

16. A lithium battery, comprising:
a cathode;
a lithium-conducting electrolyte; and
an anode comprising a carbon nanotube film without a metal current collector, the carbon nanotube film comprising two hundred layers of carbon nanotubes overlapped with each other, each of the two hundred layers of carbon nanotubes comprising a plurality of successive carbon nanotube bundles substantially aligned along a same direction, wherein the plurality of successive carbon nanotube bundles in different layers of the two hundred layers of carbon nanotubes are aligned along two perpendicular directions.

17. The lithium battery of claim 16, wherein a weight of the carbon nanotube film is about 50 micrograms.

18. The lithium battery of claim 16, wherein the structure of the carbon nanotube film is free-standing.

* * * * *